US006543593B2

United States Patent
Saito

(10) Patent No.: US 6,543,593 B2
(45) Date of Patent: Apr. 8, 2003

(54) SHIFT CONTROL APPARATUS FOR AUTOMATIC TRANSMISSION

(75) Inventor: Yuji Saito, Shizuoka (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 09/953,937

(22) Filed: Sep. 18, 2001

(65) Prior Publication Data

US 2002/0033312 A1 Mar. 21, 2002

(30) Foreign Application Priority Data

Sep. 18, 2000 (JP) ........................................ 2000-282340

(51) Int. Cl.[7] ........................... F16H 61/12; F16H 61/06
(52) U.S. Cl. ..................... 192/48.4; 192/48.7; 192/48.9; 192/48.92; 192/87.11; 192/109 F
(58) Field of Search ................................. 192/48.4, 48.7, 192/48.8, 48.9, 48.92, 49, 109 F, 87.11

(56) References Cited

U.S. PATENT DOCUMENTS 4,311,062 A  *  1/1982  Hamada et al. ................ 62/292
4,622,866 A  * 11/1986  Ito et al. ....................... 477/122
5,129,870 A  *  7/1992  Pierce .......................... 475/285

OTHER PUBLICATIONS

U.S. patent application Ser. No. 09/936,811, Murasugi et al, filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Kato, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,017, Murasugi et al, filed Sep. 18, 2001.
U.S. patent application Ser. No. 09/954,019, Saito, filed Sep. 18, 2001.
U.S. patent application Ser. No. 09/954,298, Saito, filed Sep. 18, 2001.

* cited by examiner

Primary Examiner—Saul Rodriguez
(74) Attorney, Agent, or Firm—Foley & Lardner

(57) ABSTRACT

If, in a gear shift from one-way clutch involved gear speed to another gear speed, the inertia phase control time) is less than a predetermined time length, or the effective gear ratio on the inertia phase end detection instant is out of a range between before-shift gear ratio and after-shift gear ratio, a transmission control system controls the operating fluid pressure in a time management mode to prevent a shift shock by increasing the fluid pressure) at a gradual rate $\Delta PC1$ during a longer time interval TMC1 after an end of the inertia phase.

15 Claims, 7 Drawing Sheets

FIG.2

|  | R/C | H/C | L/C | LR/B | L/OWC | 2-4/B |
|---|---|---|---|---|---|---|
| 1st |  |  | ○ | ○ | ○ |  |
| 2nd |  |  | ○ |  |  | ○ |
| 3rd |  | ○ | ○ |  |  |  |
| 4th |  | ○ |  |  |  | ○ |
| Rev | ○ |  |  | ○ |  |  |

# SHIFT CONTROL APPARATUS FOR AUTOMATIC TRANSMISSION

BACKGROUND OF THE INVENTION

The present invention relates to a shift control apparatus for an automatic transmission, and more particularly concerns a shift control apparatus to govern a shift operation from an one-way clutch (involved) gear speed, in which an oneway clutch is involved as a reaction receiving element in torque transmission, to another gear speed.

An automatic transmission is configured to determine a torque transmission path (gear speed) in a gear train by selectively hydraulically actuating (engaging) friction engagement elements such as clutches and brakes and to effect a gear change to another gear speed by switching the friction engagement elements to be engaged. The automatic transmission receives an input rotation from the engine, and delivers an output rotation at the gear ratio corresponding to a selected gear speed.

In general, a one-way clutch is used in a specific gear speed in order to prevent a shift shock in upshift, and to eliminate feel of deceleration generated by engine brake especially at a lower gear speed.

In the above-mentioned specific gear speed (referred to as an one-way clutch (involved) gear speed hereinafter), a one-way clutch is involved as a reaction receiving element in torque transmission. An upshift from the one-way clutch gear speed to a higher gear speed can be achieved only by changing the state of one friction engagement element from a disengaged state to an engaged state. In this upshift, the one-way clutch freewheels and helps prevent shift shock.

In a transition from a drive operation at the one-way clutch gear speed, to coast operation by release of the accelerator pedal, the one-way clutch disables the engine brake by freewheeling, and thereby prevents unpleasant feel of deceleration due to the engine brake at a lower gear speed.

SUMMARY OF THE INVENTION

However, the following problems has been found in a one-way clutch shift (or freewheel shift) involving the freewheeling of a one-way clutch.

In an example shown in FIG. 6, the throttle opening (degree) TVO varies with time (in a manner of time series) according to the driver's depression of the accelerator pedal. Accordingly, a shift control system produces a 2-1 downshift command for shifting from 2nd gear speed to 1st gear speed at an instant to at which the throttle opening TVO starts to increase. Immediately afterward, at an instant t2 at which the throttle opening starts to decrease, the shift control system produces a 1-3 upshift command for shifting from 1st gear speed (one-way clutch gear speed) to 3rd gear speed (non one-way clutch gear speed). However, the shift control system inhibits the 1-3 upshift until completion of the 2-1 downshift, and allows the 1-3 upshift to start at an instant t3 at which the 2-1 downshift is finished.

During a period (a) just before instant to shown in FIG. 6, the revolution speed of an associated rotating member is held at zero by engagement of a 2nd selecting brake (a 2-4 speed brake 2-4/B in an illustrated embodiment of the present invention). The transmission is in the state of 2nd speed in which a transmission output speed No is determined by a turbine speed Nt (i.e. a transmission input speed) as shown in the speed diagram of FIG. 7A. An effective gear ratio i (i.e. a transmission input-output revolution speed ratio Nt/No) is kept at the second gear ratio as shown in FIG. 6. During this period, a one-way clutch (a low one-way clutch L/OWC in the embodiment of the present invention) functioning as a reaction receiving element in 1st speed does not participate in torque transmission as evident from the diagram.

During a period (b) just after instant to shown in FIG. 6, the 2-4 speed brake 2-4/B is disengaged and the turbine speed Nt (the transmission input speed) is increased as shown by an arrow a in FIG. 7B in response to depression of the accelerator pedal (increase of the throttle opening TVO), and the effective gear ratio i (Nt/No) is increased from the second gear ratio to the first gear ratio as shown in FIG. 6.

If the accelerator pedal was held down, the turbine speed Nt (the transmission input speed) would be further raised as shown by a two-dot chain line in the speed diagram of FIG. 7B, until the low one-way clutch L/OWC would act as a reaction receiving element to prevent reverse rotation of the associated rotating member opposite to the rotational direction of the engine, and thereby the 2-1 shift would be completed to achieve the first gear ratio.

However, in the example of FIG. 6, the accelerator pedal is released and hence the throttle opening TVO is decreased during the period (c) following the period (b), so that the turbine speed Nt (the transmission input speed) is decreased as shown by an arrow β in the speed diagram of FIG. 7C. Consequently, the low one-way clutch L/OWC becomes unable to achieve engagement as shown by an arrow γ, and unable to reduce the revolution speed of the associated rotating member. Thus, the transmission becomes unable to complete the 2-1 downshift, and hence the effective gear ratio i (=Nt/No) is decreased toward the third gear ratio in the direction opposite to the first gear ratio as shown in FIG. 6.

When the turbine speed Nt further decreases as shown by solid line in the speed diagram of FIG. 7D, the effective gear ratio i (=Nt/No) decreases below the third gear ratio and even nears the fourth gear ratio as shown by hatching in a period (d) in FIG. 6 in association with the transmission output speed No (vehicle speed).

When the transmission output speed No (vehicle speed) is low, the effective gear ratio i (Nt/No) does not decrease below the third gear ratio since the transmission is brought to a state shown by two-dot chain line in the speed diagram of FIG. 7D, and the output shaft speed No becomes lower than the level in the state of 3rd speed (having a gear ratio of 1) shown by one-dot chain line in FIG. 7D.

When the 2-1 downshift becomes uncompletable as described above, the shift control system forcibly terminates the control of 2-1 downshift at instant t3 at which a predetermined time has elapsed after the instant to of the 2-1 downshift command shown in FIG. 6, in order to prevent the shift control from continuing for a long time. At the same time, the shift control system permits the 1-3 upshift by canceling the reshift inhibition imposed at instant t2, and starts the 1-3 upshift operation.

Since the effective gear ratio i (=Nt/No) is decreased below the third gear ratio as shown by hatching in FIG. 6, the shift control system judges that the inertia phase of the 1-3 shift has ended, immediately after the 1-3 shift is started at instant t3. Therefore, in order to prevent the slip of the friction engagement element after engagement notwithstanding changes in the operating condition such as changes in the input torque, or to end the 1-3 shift control as soon as possible to permit a next shift to start on demand, the shift control system engages the friction engagement element for the 1-3 shift (a high-clutch H/C in the illustrated embodiment of the present invention) steeply during the short period (e) after instant t3 and thereby varies the effective gear ratio i (=Nt/No) to the third gear ratio as shown in FIG. 6. Then, the operating state is suddenly changed, as shown by an arrow δ, from the state shown by a solid line in FIG. 7D to the state of a one-dot chain line, so that a great shift shock.

From this reason, an undesired shift shock is caused in such a reshift control from a one-way clutch gear speed to another gear speed. A shift shock is produced also when a command from a one-way clutch gear speed to another gear speed is produced by a manual shift operation, for example while the one-way clutch free-wheels and thereby prevents the engine brake despite release of the accelerator pedal at high vehicle speeds, the engine speed is decreased by the release of the accelerator pedal, and therefore, the effective gear ratio remains at a value on the higher speed side of the after-shift gear ratio.

An object of the invention is to provide shift control apparatus or process for an automatic transmission to prevent a shift shock in a one-way clutch shift. Another object is to prevent a shift shock by monitoring a condition in a one-way clutch shift, such as an effective gear ratio or a time from a start of a shift operation to an end of an inertia phase.

According to the present invention, a shift control apparatus for an automatic transmission comprises a shift controller configured: to control a one-way clutch shift operation from a first gear ratio at which a one-way clutch is involved as a reaction receiving element for torque transmission, to a second gear ratio, normally in a normal mode; and to control the one-way clutch shift operation from the first gear ratio to the second gear ratio in a time management mode if a special condition is detected.

The other objects and features of this invention will become understood from the following description with reference to the accompanying drawings.

BRIEF DESCRIPTION OF THE DRAWINGS

FIG. 2 is a table showing an engagement logic of friction engagement elements to select one of gear speeds.

FIG. 7A shows the state of the shift control during the period (a) shown in FIG. 6. FIG. 7B shows the state of the shift control during the period (b) shown in FIG. 6. FIG. 7C shows the state of the shift control during the period (c) shown in FIG. 6. FIG. 7D shows the state of the shift control during the period (d) shown in FIG. 6.

DETAILED DESCRIPTION OF THE INVENTION

Figure 1:
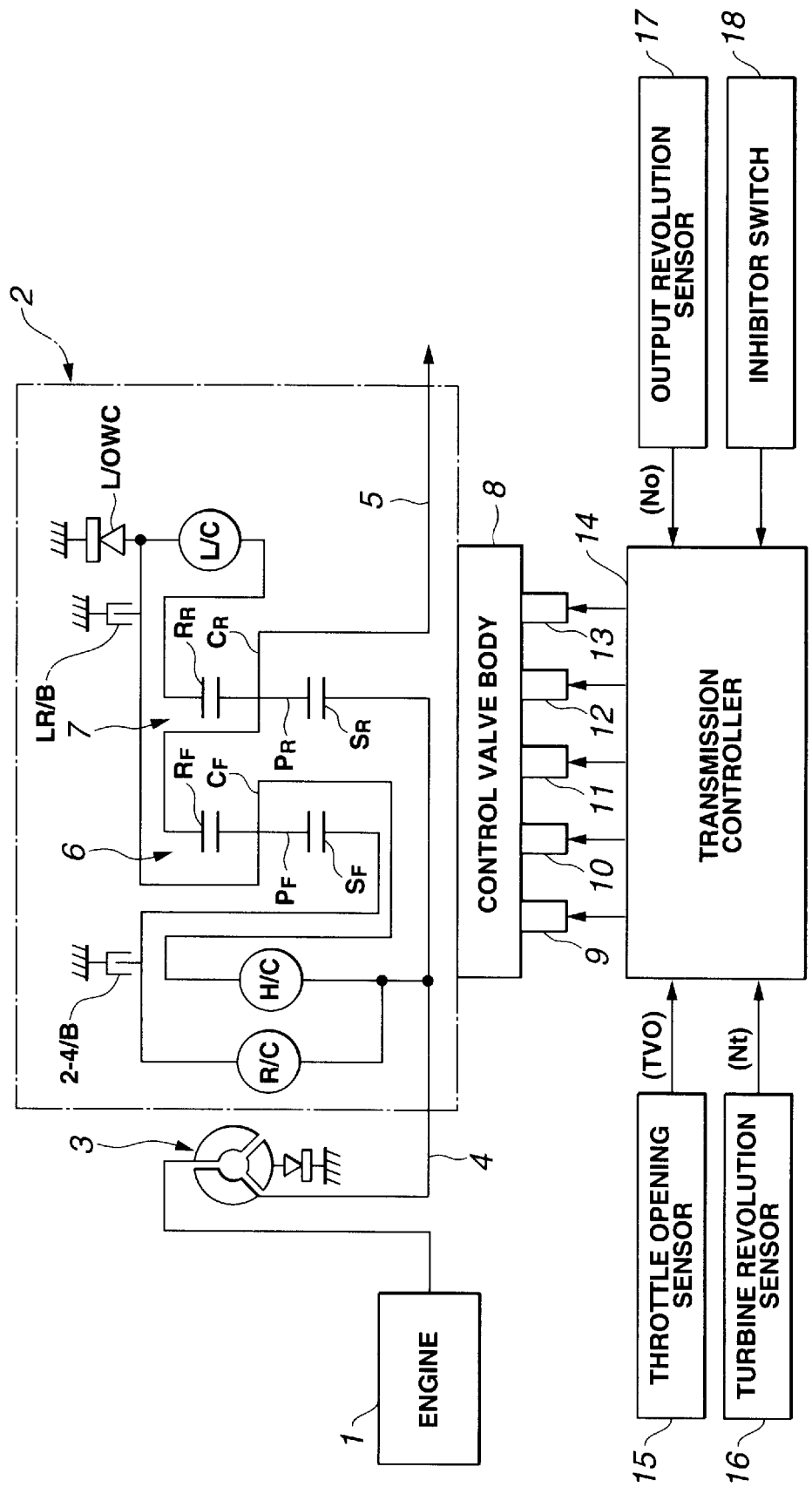
FIG. 1 is a schematic view showing a torque transmission train and a shift control system for an automatic transmission according to an embodiment of the present invention.

FIG. 1 shows a shift control system according to a first embodiment of the present invention.

In accordance with driver's depression of an accelerator pedal, a throttle valve varies its opening and thereby regulates the output of an engine 1. Output rotation of engine 1 is transmitted through a torque converter 3 to an input shaft 4 of an automatic transmission 2.

In automatic transmission 2, front and rear planetary gear sets 6 and 7 are mounted on input and output shafts 4 and 5 which are aligned end to end. Front planetary gear set 6 is located on a front side closer to engine 1. Front and rear planetary gear sets 6 and 7 are main components of a planetary speed change mechanism of automatic transmission 2.

Front planetary gear set 6 is a simple planetary gear set including a front sun gear $S_F$, a front ring gear $R_F$, front pinions $P_F$ engaging with the front sun and ring gears, and a front planet carrier $C_F$ supporting front pinions $P_F$ rotatably. Rear planetary gear set 7 is also a simple planetary gear set including a rear sun gear $S_R$, a rear ring gear $R_R$, rear pinions $P_R$ engaging with the rear sun and rear gears, and a rear carrier $C_R$ supporting rear pinions $P_R$ rotatably.

As friction elements (or devices) to determine a drive path (or speed) in the planetary gear train, there are a low clutch L/C, a 2-4 speed brake 2-4/B, a high clutch H/C, a low reverse brake LR/B, a low one-way clutch L/OWC, and a reverse clutch R/C.

The reverse clutch R/C is connected between front sun gear $S_F$ and input shaft 4 to selectively connect the front sun gear $S_F$ with input shaft 4. The 2-4 speed brake 2-4/B is disposed between front sun gear $S_F$ and a casing to hold front sun gear $S_F$ selectively. The high clutch H/C is connected between front planet carrier $C_F$ and input shaft 4 for selective connection therebetween. The low one-way clutch L/OWC is disposed between front planet carrier $C_F$ and the casing to prevent reverse rotation of the front planet carrier $C_F$ opposite to the rotational direction of the engine. The low reverse brake LR/B is arranged to hold the front planet carrier $C_F$ selectively. The low clutch L/C is connected between front planet carrier $C_F$ and rear ring gear $R_R$ for selective connection therebetween. Output shaft 5 is connected with front ring gear $R_F$ and rear planet carrier $C_R$ which are connected together. Rear sun gear $S_R$ is connected with input shaft 4.

Figure 2:
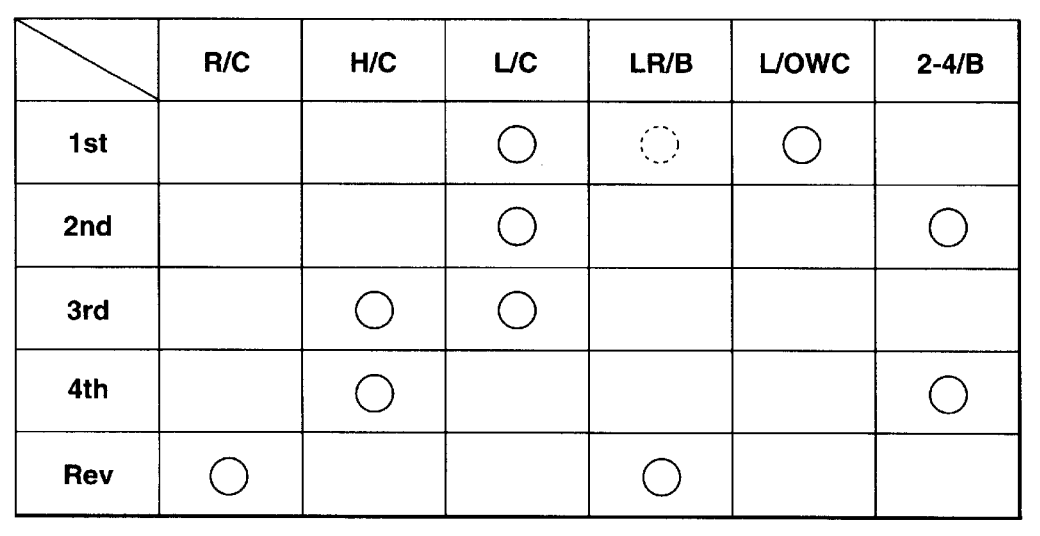

The thus-constructed planetary gear train can provide a first forward speed (1st), a second forward speed (2nd), a third forward speed (3rd), a fourth forward speed (4th) and a reverse speed (Rev), by selective fluid pressure actuation (engagement) shown by solid line circles in FIG. 2 of the five friction elements R/C, H/C, L/C, LR/B, and 2-4/B, and self engagement of low one-way clutch L/OWC shown by a solid line circle.

In first forward speed (1st), the low clutch L/C is engaged, and the one-way clutch L/OWC functions as a reaction receiving element for torque transmission, so that the first forward speed (1st) is a one-way clutch (involved) speed in this example. In the case of upshift from the one-way clutch gear speed (1st) to a non one-way clutch gear speed (2nd or 3rd), the shift can be achieved through free running of the one-way clutch only by changing the state of the corresponding friction engagement element (2-4 speed brake 2-4/B in the case of upshift to second speed, or high clutch H/C in the case of upshift to third speed) from disengaged to engaged. This facilitates prevention of a shift shock.

When the accelerator pedal is released during operation at first forward speed (that is, one-way clutch gear speed), and thereby a coasting operation is initiated, the low one-way clutch L/OWC disables engine braking by free wheeling and thereby prevents unpleasant deceleration feeling from being caused by release of the accelerator pedal at low gear speed. When engine brake is required during driving at first forward speed, this control system can effect engine braking by fluid pressure actuation (or engagement) of the low reverse brake LR/B as shown by a broken line circle in FIG. 2, and thereby renders the low one-way clutch L/OWC unable to free wheel.

A control valve body 8 includes a hydraulic control circuit to achieve the engagement logic shown in FIG. 2, of the shift control friction elements L/C, 2-4/B, H/C, LR/B, and R/C. In addition to pressure regulator valve and manual valve (not shown), the control valve body 8 includes a line pressure solenoid 9, a low clutch solenoid 10, a 2-4 speed brake solenoid 11, a high clutch solenoid 12 and a low reverse brake solenoid 13.

The line pressure solenoid 9 is arranged to change the line pressure to a high level by applying a solenoid pressure therefrom to the pressure regulator valve in the ON state, and to change the line pressure to a low level in the OFF state. The shift control system utilizes the line pressure thus switched between the high and low levels, as a source or primary pressure for all shift control operations. The manual valve is operated by the driver, among a forward drive range position (D), a reverse range position (R), and park and stop range positions (P, N).

In D range, the manual valve supplies the above-mentioned line pressure as a D range pressure to the low clutch solenoid 10, the 2-4 brake solenoid 11, the high clutch solenoid 12 and the low reverse brake solenoid 13. Each of the solenoids 10~13 reduces the line pressure directed to the corresponding one of the low clutch L/C, the 2-4 speed brake 2-4/B, the high clutch H/C and the low reverse brake LR/B, in accordance with the solenoid pressure generated by the duty control from the above-mentioned D range pressure. Thus, the solenoids 10~13 can regulate the operating fluid pressures of these friction engagement elements individually, and the shift control system can achieve the engagement logic from first gear to fourth gear shown in FIG. 2 by the duty control of solenoids 10~13.

In R range, the manual valve outputs the above-mentioned line pressure as a R range pressure and supplies this pressure to the reverse clutch R/C and the low reverse brake LR/B for engagement. Thus, the engagement logic of reverse drive is achieved.

In P and N ranges, the manual valve is in a state supplying the line pressure to none of the circuits and thereby puts the automatic transmission in a neutral state, by disengaging all the friction elements.

A transmission controller 14 controls the line pressure solenoid 9 in the on/off control mode 8 (to switch the line pressure between the high and low levels), and controls the low clutch solenoid 10, 2-4 speed brake solenoid 11, high clutch solenoid 12 and low reverse brake solenoid 13 in the duty control mode in accordance with input information supplied from the following input devices.

A throttle opening sensor 15 senses a throttle opening (degree) TVO of the engine 1. A turbine revolution sensor (or input revolution sensor) 16 senses a turbine speed Nt which is an output speed of the torque converter 3 (i.e., the transmission input speed). An output revolution sensor 17 senses a speed No of the output shaft 5 of the automatic transmission 2. An inhibitor switch 18 senses a selected range.

By executing a control program (not shown), the transmission controller 14 retrieves a desired speed for a current driving condition in accordance with the throttle opening (degree) TVO and the transmission output speed No (i.e., vehicle speed), from a predetermined control map. Then, controller 14 checks if the currently selected actual speed is identical to the desired speed. If it is not, controller 14 produces a shift command to effects a gear shift from the actual speed to the desired speed by switching the engagement state and the disengagement state of the friction elements according to the engagement logic of FIG. 2 by varying the operating fluid pressures under the duty control of the solenoids 10~13.

Figure 6:
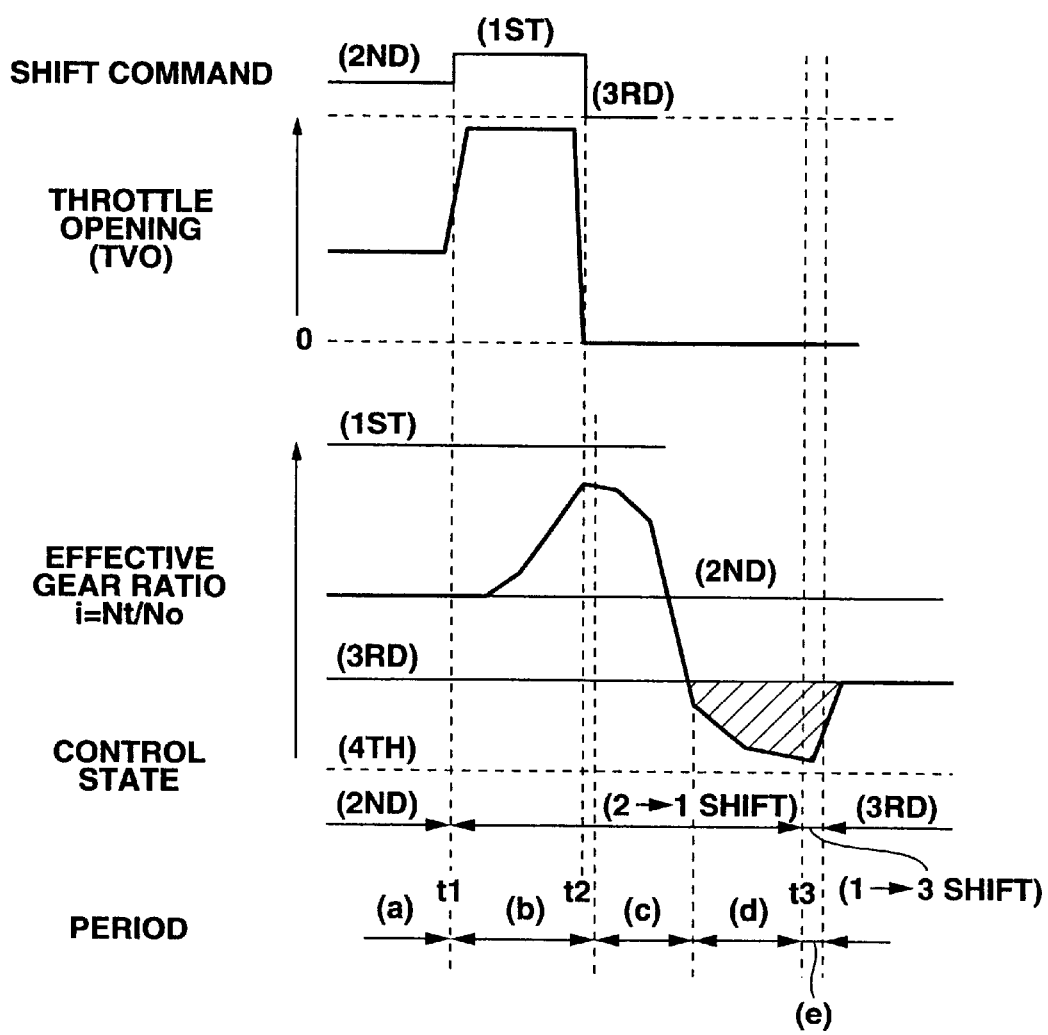
FIG. 6 is a time chart showing a shift control operation of earlier technology, with the case of 1-3 reshift after 2-1 shift.
Figure 7A:
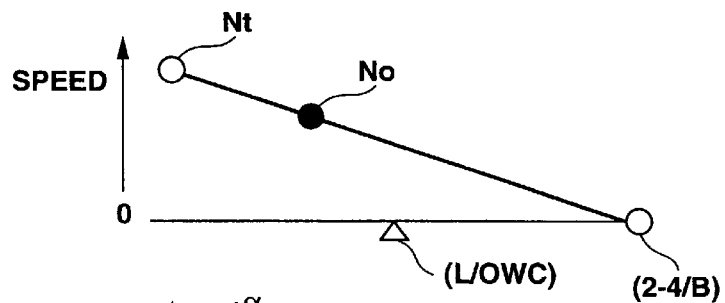
FIGS. 7A~7D are speed diagrams showing various states in the shift control system of FIG. 6.
Figure 7B:
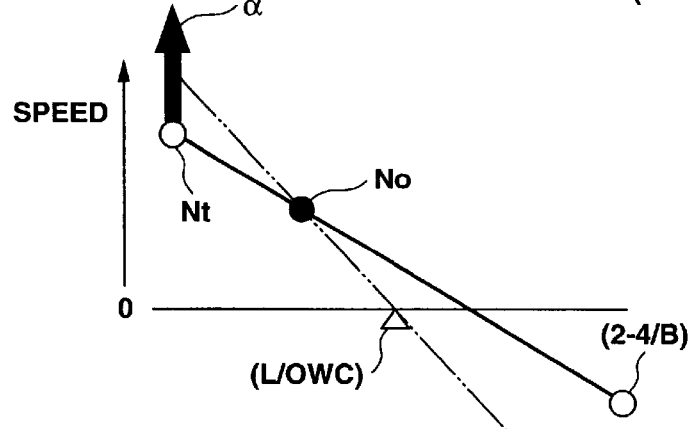
Figure 7C:
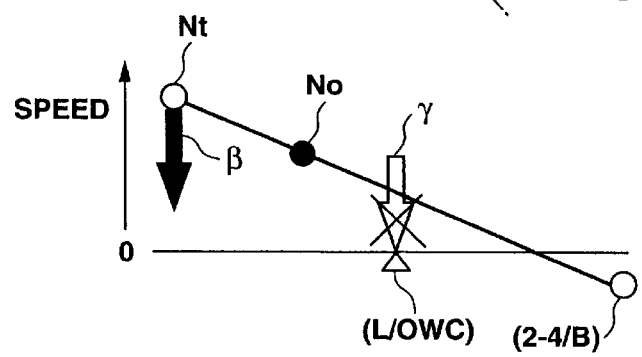
Figure 7D:
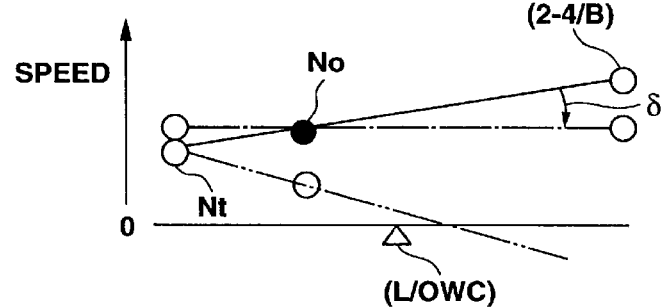

The following description deals with the process after the end of the inertia phase in the shift control from the one-way clutch (involved) gear speed to another gear speed according to the present invention. In this example, a 1-3 shift is effected after the instant t3 in FIG. 6. The process is shown in FIG. 3.

Figure 3:
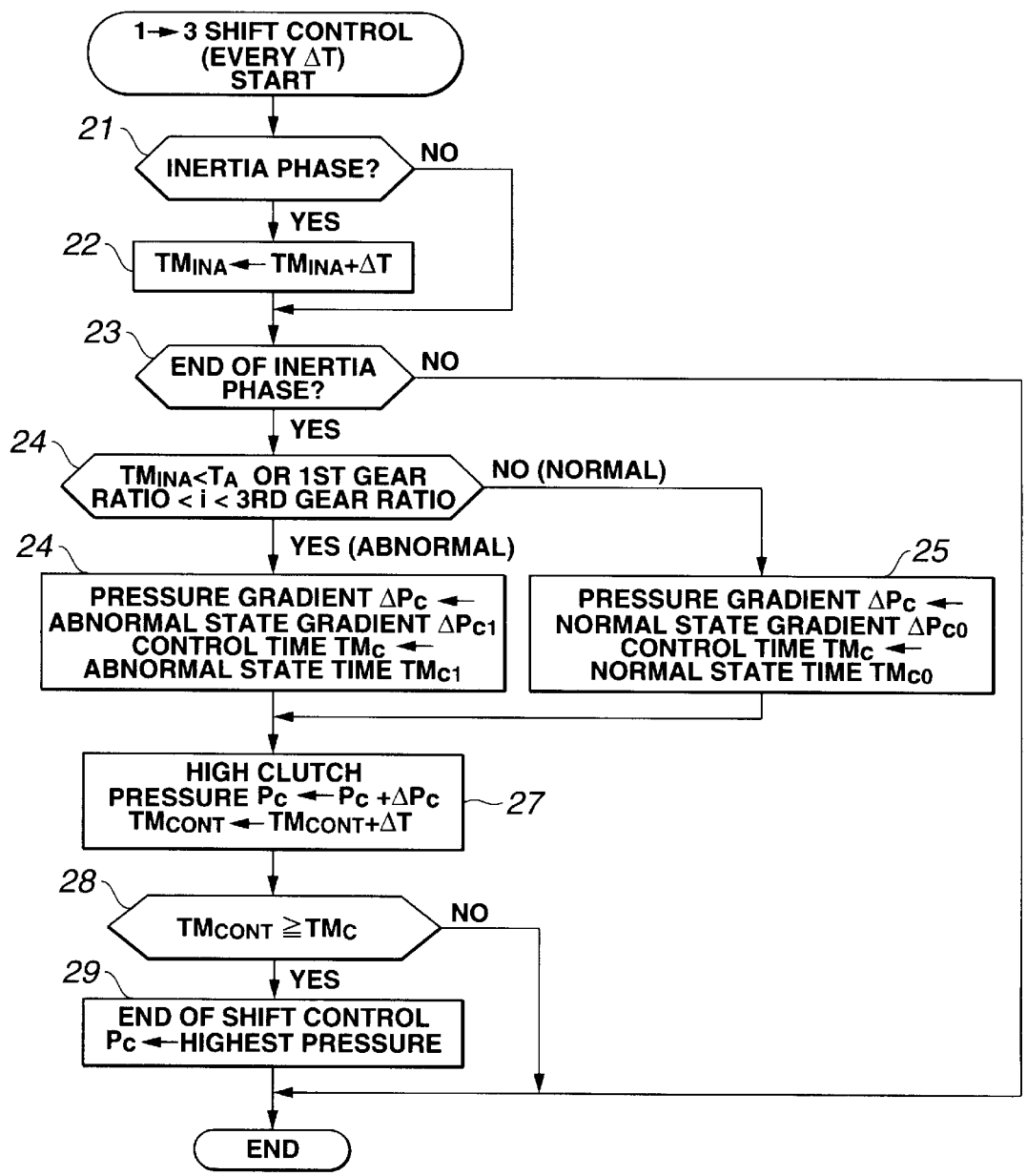
FIG. 3 is a flow chart showing a shift control program of the shift control system according to the embodiment.
Figure 4:
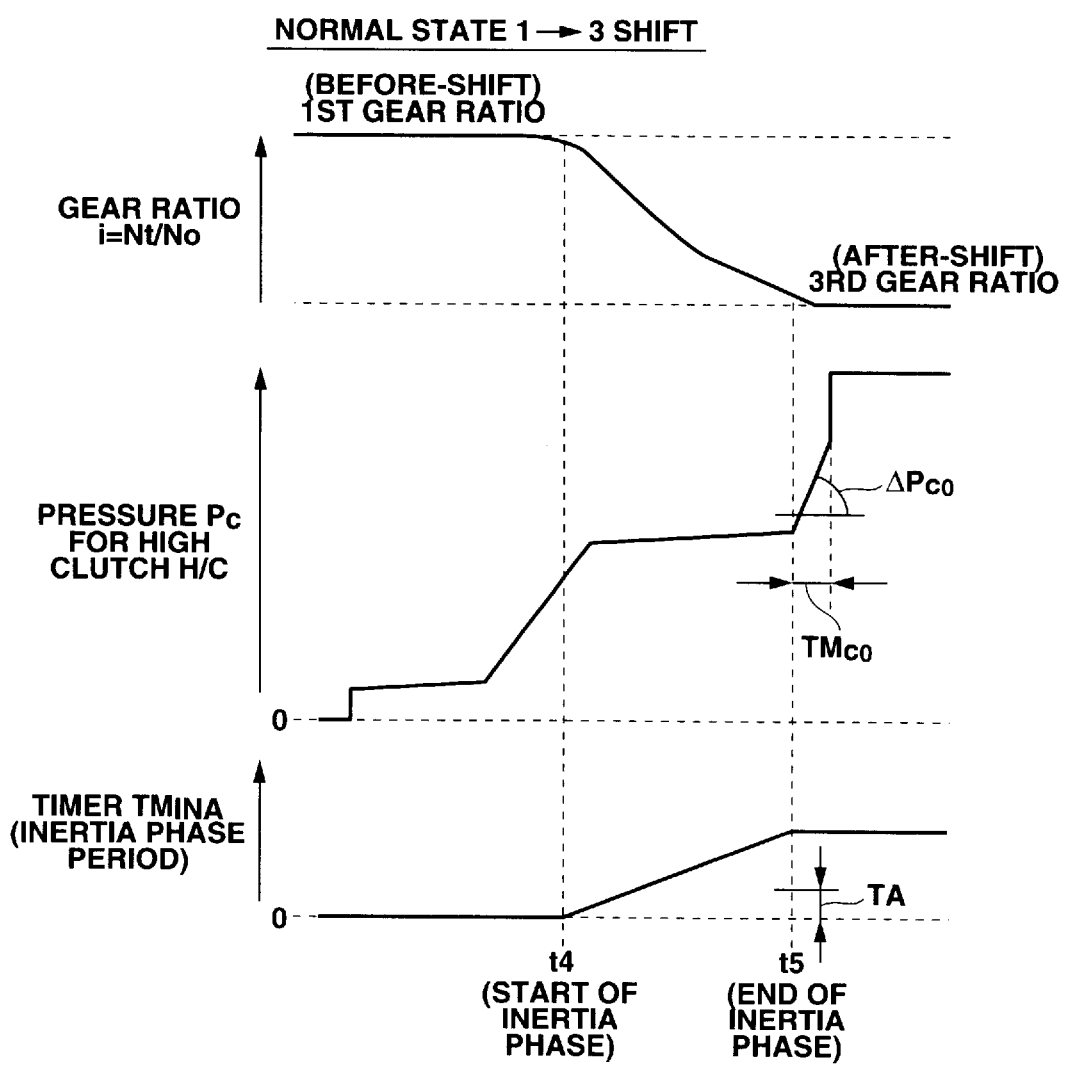
FIG. 4 is a time chart of 1-3 shift operation in a normal control mode effected by the shift control system according to the embodiment.

The control program shown in FIG. 3 for process after the end of the inertia phase is performed by timer interrupt repeatedly at regular time intervals of predetermined period $\Delta T$.

First, in step 21, controller 14 checks if the inertia phase is in progress. The inertia phase is a phase during which the effective gear ratio i (expressed as an input to output speed ratio Nt/No between the transmission input speed and the transmission output speed) varies from the before-shift gear ratio (1st) to the after-shift gear ratio (3rd).

If the determination that the inertia phase is in progress (YES of step 21) is made, a timer $TM_{INA}$ is incremented by the predetermined period $\Delta T$ in step 22. If the determination that the inertia phase is not in progress (NO of step 21) is made, step 22 is skipped. Thus, the inertia phase time duration (referred to as $TM_{INA}$) is measured.

In step 23, controller 14 checks if the inertia phase has ended. If the determination that the inertia phase has not ended (NO of step 23) is made, the control is directly terminated. If the determination that the inertia phase has ended (YES of step 23) is made, the routine proceeds to the next step 24.

In step 24, controller 14 checks if the inertia phase time duration $TM_{INA}$ is less than the predetermined time TA for judging an occurrence of a special condition, or if the effective gear ratio i (equal to Nt/No) is out of the range between the before-shift gear ratio (first gear) and the after-shift gear ratio (third gear) (i>1st gear ratio or i<3rd gear ratio).

If the inertia phase time duration $TM_{INA}$ is more than or equal to the predetermined time $T_A$, and the effective gear ratio i (Nt/No) is in the range between the before-shift gear ratio and the after-shift gear ratio, the answer of step 24 is negative (NO), and the routine proceeds to step 25 (normal state control mode) on the assumption that there is no substantial possibility of undesired shift shock.

Step 25 is a step to control the fluid pressure (the high clutch pressure Pc) for the high clutch H/C to be engaged in the 1-3 shift in a normal control mode by setting an after-inertia-phase high clutch pressure gradient (or rate) $\Delta Pc$ to a normal state gradient $\Delta P_{C0}$ ($\Delta Pc = \Delta P_{C0}$), and setting an after-inertia-phase high clutch pressure control time interval $TM_C$ to a normal state time interval $TM_{C0}$ ($TMc = TM_{C0}$). The after-inertia-phase high clutch pressure gradient $\Delta Pc$ is an increasing rate of the operating fluid pressure Pc of the high clutch H/C to be engaged in the 1-3 shift operation from 1st gear to 3rd gear. The after-inertia-phase high clutch pressure control time interval TMC is a time period during which the operating fluid pressure is increased at the after-inertia-phase high clutch pressure gradient $\Delta Pc$.

If the inertia phase time duration $TM_{INA}$ is less than the predetermined time $T_A$, or the effective gear ratio i (Nt/No) is out of the range between the before-shift gear ratio (first gear) and the after-shift gear ratio (third gear), there is a special condition tending to cause an undesired shift shock, and the routine proceeds from step 24 to step 26 in response to a special condition signal (YES of step 24).

In step 26 (special or abnormal state control mode), controller 14 prepare to control the high clutch pressure Pc for the high clutch H/C in a time management control mode by setting the after-inertia-phase high clutch pressure gradient (rate) $\Delta Pc$ to a special state gradient $\Delta P_{C1}$ and the after-inertia-phase high clutch pressure control time interval $TM_C$ to a special state time interval $TM_{C1}$. The special state gradient $\Delta P_{C1}$ is more gradual than the normal state gradient $\Delta P_{C0}$ and the special state time interval $TM_{C1}$ is longer than the normal state time interval $TM_{C0}$.

In step 27, the high clutch pressure Pc is increased at the after-inertia-phase high clutch pressure gradient $\Delta Pc$ (set equal to $\Delta P_{C0}$ in step 25 or to $\Delta P_{C1}$ in step 26), and the timer $TM_{CONT}$ is incremented by the predetermined time $\Delta T$. This timer $TM_{CONT}$ is to measure the elapsed time from the instant at which a judgment is made that the inertia phase is finished (hereinafter referred to as after-inertia-phase elapsed time $TM_{CONT}$).

In step 28, controller 14 checks if the after-inertia-phase elapsed time $TM_{CONT}$ has reached the after-inertia-phase high clutch pressure control time interval $TM_C$ (set to $TM_{C0}$ in step 25 or to $TM_{C1}$ in step 26). The after-inertia-phase control is continued and the high clutch pressure Pc is increased at the after-inertia-phase high clutch pressure gradient $\Delta Pc$ ($\Delta P_{C0}$ in step 25 or $\Delta P_{C1}$ in step 26) until $TM_{CONT}$ becomes equal to or more than $TM_C$. When $TM_{CONT}$ becomes equal to or more than $TM_C$ ($TM_{CONT} \geq TM_C$), the routine proceeds to step 29. In step 29, controller 14 determines that the shift control has ended and increases the high clutch pressure Pc sharply to the maximum level equaling the above-mentioned line pressure of the source pressure.

In order to prevent the slip of the friction engagement element after engagement by changes of the status such as the input torque, or to end the 1-3 shift control as soon as possible and start the next shift on demand, the normal state time interval $TM_{C0}$ is set to be shorter and the normal state gradient $\Delta P_{C0}$ is set to be steeper. Such a setting does not have an influence on a shift shock, because the inertia phase has correctly ended before the control by the gradient $\Delta P_{C0}$. Further, the inertia phase time duration $TM_{INA}$ is long enough to vary the effective gear ratio i gradually from the before-shift gear ratio to the after-shift gear ratio, and to prevent a undesired shift shock.

Figure 5:
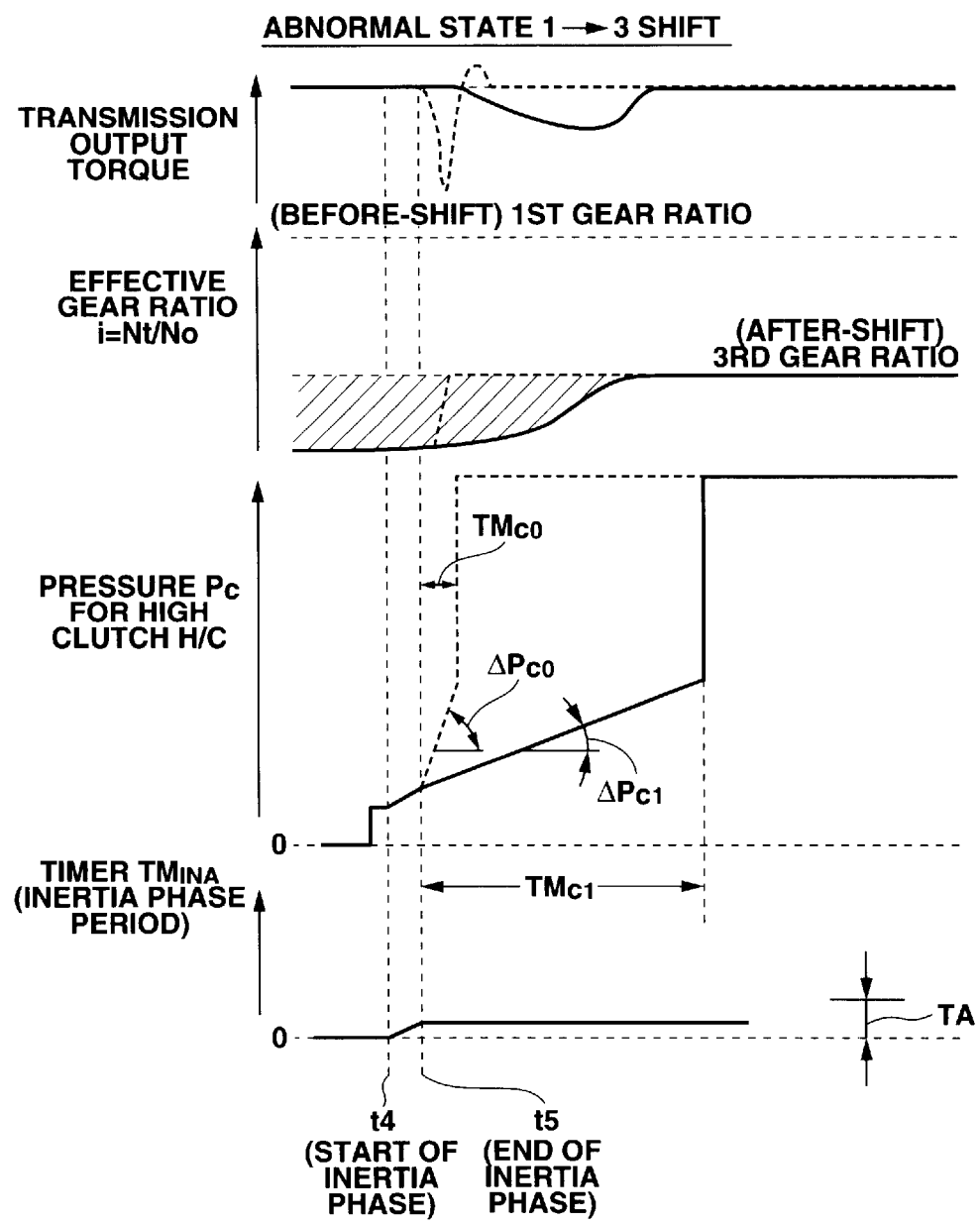
FIG. 5 is a time chart of 1-3 shift operation in a special state control mode effected by the shift control system according to the embodiment.

If, on the other hand, the inertia phase time duration $TM_{INA}$ is less than the predetermined time $T_A$, or the effective gear ratio i (equal to Nt/No) is out of the range between before-shift gear ratio (1st) and after-shift gear ratio (3rd), in other words, there is a possibility of a shift shock, this shift control system controls the high clutch pressure in a time management mode (or special state control mode), instead of the normal control mode, so as to prevent a steep increase in the high clutch pressure Pc in the normal mode. After the effective gear ratio i detected by controller 14 becomes less than the inertia phase end detection gear ratio (which is set equal to a ratio slightly higher than the after-shift gear ratio), and hence controller 14 judges at instant t5 that the inertia phase has come to an end, the pressure control in the normal mode would increase the high clutch pressure Pc at a steep gradient $\Delta P_{C0}$ within a short time period $TM_{C0}$ as shown by broken line in FIG. 5 after the inertia phase end detection instant t5, even though there may be a deviation of the effective gear ratio detected by controller 14 from the actual effective gear ratio or there may be a possibility that the after-shift gear ratio (3rd) is not reached yet. Therefore, the effective gear ratio i (equal to Nt/No) would be changed abruptly from a gear ratio value on the higher speed side of the after-shift gear ratio (3rd), to the after-shift gear ratio (3rd) after the inertia phase end detection instant t5 as shown by broken line in FIG. 5, resulting in an undesired shift shock in a transmission output torque waveform as shown by broken line in FIG. 5.

In the embodiment according to the present invention, the after-inertia-phase high clutch pressure gradient $\Delta Pc$ is set to the special state gradient $\Delta P_{C1}$ which is smaller than the normal state gradient $\Delta P_{C0}$, and the after-inertia-phase high clutch pressure control time interval $TM_C$ is set to the special state time interval $TM_{C1}$ which is longer than the normal state time interval $TM_{C0}$. So the effective gear ratio i is gradually varied to the after-shift gear ratio (3rd) after the inertia phase end detection instant t5 as shown by solid line in FIG. 5. Thus, the shift control system according to the present invention can prevent an undesired shift shock in a transmission output torque waveform as shown by a solid line in FIG. 5.

In the above-mentioned embodiment, the automatic transmission 2 is a direct acting type automatic transmission capable of controlling the operating fluid pressures to the friction engagement elements directly and individually with solenoid 10~13. However, the present invention is also applicable to an ordinary automatic transmission arranged to control the operating fluid pressures for the engagement elements through an accumulator or some other shock absorbing device transiently during a shift operation because the shift operation is effected by selectively providing the common line pressure to the friction engagement elements under the control of shift valve.

The ordinary automatic transmission is arranged to ease a sharp increase in a fluid pressure and thereby to act to prevent a shift shock by the transient state control of the fluid pressure on the friction engagement elements with the accumulator during a shift operation. Accordingly, the shift control system can prevent a steep rise in the fluid pressure and prevent a shift shock even if the friction engagement element is engaged suddenly.

By contrast, the direct acting type automatic transmission controls the operating fluid pressure for each friction engagement element directly with a pressure-regulating valve freely between zero and the line pressure without the need for a shock absorbing device such as an accumulator. If a friction engagement element is engaged suddenly, therefore, the automatic transmission of this type will produce a shift shock by increasing the operating fluid pressure steeply up to the line pressure. Therefore, the present invention can provide marked effects when applied to a direct acting type automatic transmission as in the embodiment.

Although the invention has been described above by reference to certain embodiments of the invention, the invention is not limited to the embodiments described above. Modifications and variations of the embodiments described above will occur to those skilled in the art in light of the above teachings. The present invention is applicable to any gear shift operation involving freewheeling of a one-way clutch, and to any other shift operations satisfying a condition that an effective gear ratio at a start of the shift is the gear ratio of the after-shift gear speed. The scope of the invention is defined with reference to the following claims.

The present application is based on a Japanese Patent Application No. 2000-282340, filed in Japan on Sep. 18, 2000. The entire contents of the Japanese Patent Application No. 2000-282340 are hereby incorporated by reference.

What is claimed is:

1. A shift control apparatus for an automatic transmission, the shift control apparatus comprising a shift controller configured:

to control a one-way clutch shift operation from a first gear ratio at which a one-way clutch is involved as a reaction receiving element for torque transmission, to a second gear ratio, normally in a normal mode; and to control the one-way clutch shift operation from the first gear ratio to the second gear ratio in a time management mode if an effective gear ratio between a transmission input speed and a transmission output speed is out of a range between the first and second gear ratios.

2. The shift control apparatus as claimed in claim 1 wherein the shift controller is configured to vary an operating fluid pressure for a friction engagement element to be switched from one of an engaged state and a disengaged state to the other in the one-way clutch shift operation, at a predetermined first rate in the time management mode until the expiration of a predetermined first time interval from an end of an inertia phase distinguished by the effective gear ratio.

3. The shift control apparatus as claimed in claim 2 wherein the shift controller is configured to vary the operating fluid pressure for the friction engagement element to be switched from one of the engaged state and the disengaged state to the other in the shift operation, at a predetermined second rate in the normal mode until the expiration of a predetermined second time interval from the end of the inertia phase, the first rate being a rate with respect of time which is more gradual than the second rate, and the first time interval being longer than the second time interval.

4. The shift control apparatus as claimed in claim 3 wherein the shift controller is configured to increase the operating fluid pressure for the friction engagement element at the predetermined first rate in the time management mode until the expiration of the predetermined first time interval from an inertia phase end detection instant at which the end of the inertia phase is detected, and further to increase the operating fluid pressure for the friction engagement element at a steep time rate steeper than the second rate to a full engagement pressure level after the expiration of the predetermined first time interval.

5. The shift control apparatus as claimed in claim 4, wherein the shift controller is configured to increase the operating fluid pressure for the friction engagement element at a predetermined gradual time rate until the end of the inertia phase is detected, and the second rate is greater than the gradual rate.

6. The shift control apparatus as claimed in claim 1, wherein the shift control apparatus further comprises an actuator group of actuators each regulating a unique one of operating fluid pressures, respectively, to engage and disengage a plurality of friction engagement elements selectively to select one of gear ratios of the automatic transmission.

7. A shift control apparatus for an automatic transmission, the shift control apparatus comprising a shift controller configured:

to control a one-way clutch shift operation from a first gear ratio at which a one-way clutch is involved as a reaction receiving element for torque transmission, to a second gear ratio, normally in a normal mode; and to control the one-way clutch shift operation from the first gear ratio to the second gear ratio in a time management mode if a time duration from a start of a gear shift from the first gear ratio to the second gear ratio, to an end of an inertia phase distinguished by an effective gear ratio between a transmission input speed and a transmission output speed is smaller than a predetermined value.

8. The shift control apparatus as claimed in claim 7 wherein the shift controller is configured to vary an operating fluid pressure for a friction engagement element to be switched from one of an engaged state and a disengaged state to the other in the one-way clutch shift operation, at a predetermined first rate in the time management mode until the expiration of a predetermined first time interval from an inertia phase end instant at which an end of an inertia phase is detected.

9. The shift control apparatus as claimed in claim 8 wherein the shift controller is configured to vary the operating fluid pressure for the friction engagement element to be switched from one of the engaged state and the disengaged state to the other in the one-way clutch shift operation, at a predetermined second rate in the normal mode until the expiration of a predetermined second time interval from the inertia phase end instant, the first rate being smaller than the second rate, and the first time interval being longer than the second time interval.

10. The shift control apparatus as claimed in claim 9 wherein the shift controller is configured to increase the operating fluid pressure for the friction engagement element at the predetermined first rate in the time management mode until the expiration of the predetermined first time interval from the inertia phase end instant, and further to increase the operating fluid pressure for the friction engagement element at a steep rate steeper than the second rate to a full engagement pressure level for full engagement of the friction engagement element after the expiration of the predetermined first time interval; and wherein the shift controller is configured to increase the operating fluid pressure for the friction engagement element at a predetermined gradual rate until the end of the inertia phase is detected, and the second tie rate is greater than the gradual rate.

11. The shift control apparatus as claimed in claim 7, wherein the shift control apparatus further comprises an actuator groups of actuators each regulating a unique one of operating fluid pressures, respectively, to engage and disengage a plurality of friction engagement elements of the automatic transmission to select one of gear ratios.

12. A shift control system for a vehicle, comprising:

an automatic transmission; and a shift controller to govern a one-way clutch gear shift from a first gear ratio at which a one-way clutch is involved as a reaction receiving element for torque transmission, to a second gear ratio;

to produce a special condition signal when a special condition is detected in an inertia phase in the one-way clutch shift operation; and to control a one-way clutch shift operation to effect the one-way clutch gear shift from the first gear ratio to the second gear ratio in a normal mode if the special condition signal is absent, and in a time management mode if the special condition signal is present.

13. The shift control apparatus as claimed in claim 12, wherein the shift controller is configured to check an effective gear ratio between a transmission input speed and a transmission output speed at the end of the inertia phase and to produce the special condition signal if the effective gear ratio is out of a range between the first and second gear ratios.

14. The shift control apparatus as claimed in claim 12, wherein the shift controller is configured to measure a time duration of the inertia phase from a start of variation of the effective gear ratio from the first gear ratio toward the second gear ratio, to an end of the inertia phase, and to produce the special condition signal if the time duration of the inertia phase is smaller than a predetermined time length.

15. A shift control process for an automatic transmission for a vehicle, comprising:

a step of monitoring a condition of an inertia phase in a one-way clutch gear shift from a first gear ratio at which a one-way clutch is involved as a reaction receiving element for torque transmission, to a second gear ratio;

a step of producing an special condition signal if the condition of the inertia phase is in a predetermined state for special condition judgment; and to control a one-way clutch shift operation to effect the one-way clutch gear shift from the first gear ratio to the second gear ratio in a normal mode if the special condition signal is absent, and in a time management mode if the special condition signal is present.

* * * * *